United States Patent
Miller

Patent Number: 6,155,086
Date of Patent: Dec. 5, 2000

[54] STEERING SHAFT LOCK AND METHOD

[76] Inventor: Richard E. Miller, 2365 Marconi Ct., Ste. E, San Diego, Calif. 92173

[21] Appl. No.: 09/419,264

[22] Filed: Oct. 15, 1999

[51] Int. Cl.[7] .................................................. B60R 25/02
[52] U.S. Cl. ................................. 70/14; 70/182; 70/237; 70/183
[58] Field of Search ......................... 70/14, 18, 181–186, 70/253, 237, 57, 58, 206

[56] References Cited

U.S. PATENT DOCUMENTS

| | | | |
|---|---|---|---|
| 977,533 | 12/1910 | Myers | 70/182 |
| 1,098,954 | 6/1914 | Meyer | 70/14 |
| 1,236,913 | 8/1917 | Cote | 70/182 |
| 1,346,135 | 7/1920 | Ritchie | 70/182 |
| 1,453,497 | 5/1923 | Farlow | 70/253 |
| 4,057,892 | 11/1977 | Drayton | 70/14 |
| 4,107,958 | 8/1978 | Manley, Jr. | 70/183 X |
| 4,505,140 | 3/1985 | Solow | 70/424 |
| 4,538,435 | 9/1985 | Romero | 70/183 |
| 4,658,609 | 4/1987 | Mickelson | 70/183 |
| 4,683,729 | 8/1987 | Rogers | 70/14 X |
| 4,768,358 | 9/1988 | Viola et al. | 70/14 |
| 4,768,361 | 9/1988 | Derman | 70/14 X |
| 4,938,040 | 7/1990 | Humphreys, Jr. | 70/14 X |
| 5,765,408 | 6/1998 | Sanseverino | 70/182 X |
| 5,782,115 | 7/1998 | Judy | 70/164 |

*Primary Examiner*—Suzanne Dino Barrett
*Attorney, Agent, or Firm*—Frank G. Morkunas

[57] ABSTRACT

A steering shaft lock for heavy-duty trucks having a steering shaft and accessible universal joint. The steering shaft lock has an elongated member and a flexible member attached to one end of the elongated member. The elongated member is steel bar-like member and the flexible member is a link-chain type member having one or more apertures or links. The elongated member is adapted to engage a spaced defined in the universal joint and protrude therefrom. The flexible member is adapted to lockingly engage the outer perimeter of the elongated member (at the point of its protrusion) with a locking device, such as a padlock. The steering shaft is locked by moving the flexible member toward the protrusion of the elongated member and placing the shackle of a locking device through one aperture of the flexible member and over the outer perimeter of the elongated member. Another method of locking is by moving the flexible member toward the protrusion of the elongated member, wrapping the flexible member around the elongated member near to its point of protrusion, and placing the shackle of a locking device through at least two adjacent apertures of the flexible member in a pinching relationship around the elongated member.

13 Claims, 1 Drawing Sheet

STEERING SHAFT LOCK AND METHOD

CROSS REFERENCES TO RELATED APPLICATIONS

Not applicable.

STATEMENT REGARDING FEDERALLY-SPONSORED RESEARCH OR DEVELOPMENT

Not applicable.

BACKGROUND OF THE INVENTION

This present invention relates to an improvement in steering wheel locks, and more particularly to cab-over-engine tractor trailers having steering shafts with an exposed-to-the-cab universal joint.

There are many devices dealing with steering wheel locks; but none as simple in structure, use, and convenience as well as being relatively inexpensive and relatively simple to produce as the present invention. Of note are U.S. Pat. No. 1,346,763 issued to Morris on Jul. 13, 1920; U.S. Pat. No. 3,722,239 issued to Mestre on Mar. 27, 1973; U.S. Pat. No. 4,505,140 issued to Solow on Mar. 19, 1985; and U.S. Pat. No. 4,538,435 issued to Romero on Sep. 3, 1985. None has adequately solved the problem associated with theft, ease of use, simplicity of manufacture, and low-cost of manufacture.

Accordingly, several objects and advantages of my invention are to provide an inexpensive, durable, yet easy-to-use, lock and locking procedure for such heavy-duty trucks; to prevent, or at least, to minimize the occurrences of theft of such heavy-duty trucks; to provide a lock which is simple to manufacture; to provide a lock which is difficult to breach by cutting with a torch, saw, or bolt cutters, and the like; and to provide a lock which is portable.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a steering wheel/shaft lock for heavy-duty trucks and method for locking the steering wheel assembly for such trucks. The steering shaft lock is primarily intended for cab-over-engine tractor trailers having a steering wheel, a steering shaft connected to the steering wheel, and an accessible universal joint on the steering shaft. The steering shaft lock has an elongated, steel-bar like member with a flexible, link-chain, member, with one or more apertures or links, attached to it. The elongated member is adapted to engage the spaced defined in the universal joint by protruding therefrom and the flexible member is adapted to lockingly engage the outer perimeter of the elongated member (at the point of its protrusion) and a locking device.

Locking engagement of the elongated member and the flexible member is accomplished in either of two methods. One is by moving the flexible member toward the protrusion of the elongated member and placing the shackle of a lock through one aperture of the flexible member and over the outer perimeter of the elongated member. The second is by moving the flexible member toward the protrusion of the elongated member, wrapping the flexible member around the elongated member near to its point of protrusion, and placing the shackle of a lock through at least two adjacent apertures of the flexible member in a pinching relationship around the elongated member.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
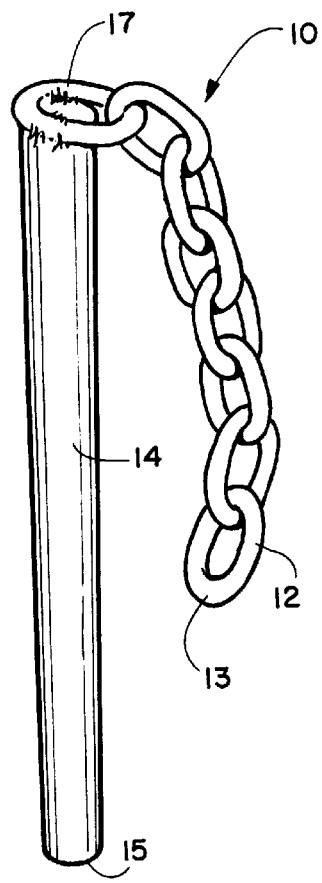
FIG. 1 is a perspective view of the steering shaft lock.

Referring now to the drawings in detail and in particular to FIG. 1, reference character 10 generally designates the steering shaft lock constructed in accordance with a preferred embodiment of the present invention. It has an elongated member 14 with a free end 15 and another end 17 to which a flexible member 12 is connected. Each member 12, 14 is of a predetermined length, preferably with the flexible member 12 being no longer than the elongated member 14 for reasons to be explained below.

The elongated member 14 may be of any configuration including, but not limited to, round, oblong, square, rectangular, hexagonal, octagonal, and the like, provided the shape thereof does not preclude insertion of the elongated member 14 into a universal joint associated with the steering wheel assembly of heavy-duty trucks. I have found that a round bar is best suited for this purpose. The elongated member 14 also may be made of any strong, durable material; preferably steel, such that the elongated member 14 cannot easily be cut (by any method such as, but not limited to, torching or sawing) or broken. I have found that hot-rolled steel works well for this purpose but cold-rolled steel is better, and that the bar is best configured as round with between a ⅝ inch to ⅞ inch diameter. A ¾ inch diameter seems to work best for the universal joint. It must be understood that the elongated member 14 may still be cut but that such cutting (by torch or saw) is very time-consuming and, to most fast-money thieves, not worth the time.

The flexible member 12 illustrated here is a chain-link type member. Although any flexible elements may be used, they should share some of the same 'tamper-resistant' characteristics as that of the elongated member 14 and should have at least one aperture. I have found that a zinc-coated steel chain, with links having a thickness of at least ⁵⁄₁₆ inch, to function well for this purpose. For this invention, and the purpose for which it service, I have found that a chain with ⅜ inch links is well suited.

Figure 2:
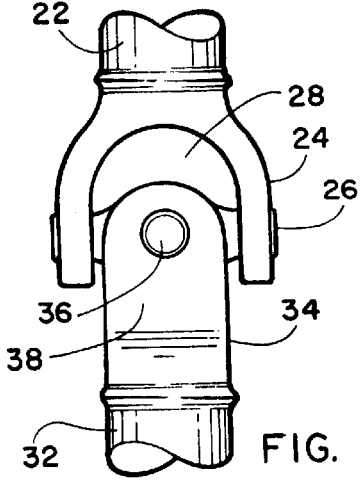
FIG. 2 is detailed partial view of a universal joint, steering-wheel shaft assembly.

FIG. 2 illustrates a typical universal joint used in many heavy-duty truck steering-wheel assemblies. These assemblies have an upper shaft 22 and a lower shaft 32. The two shafts are connected by way of the upper universal joint yoke 24, the lower universal joint yoke 34, and the respective pins 26, 36. A space is defined between the respective pins 26, 36 and yokes 24, 34. The upper space 28 is visible in this figure but the lower space 38 is not.

Figure 3:
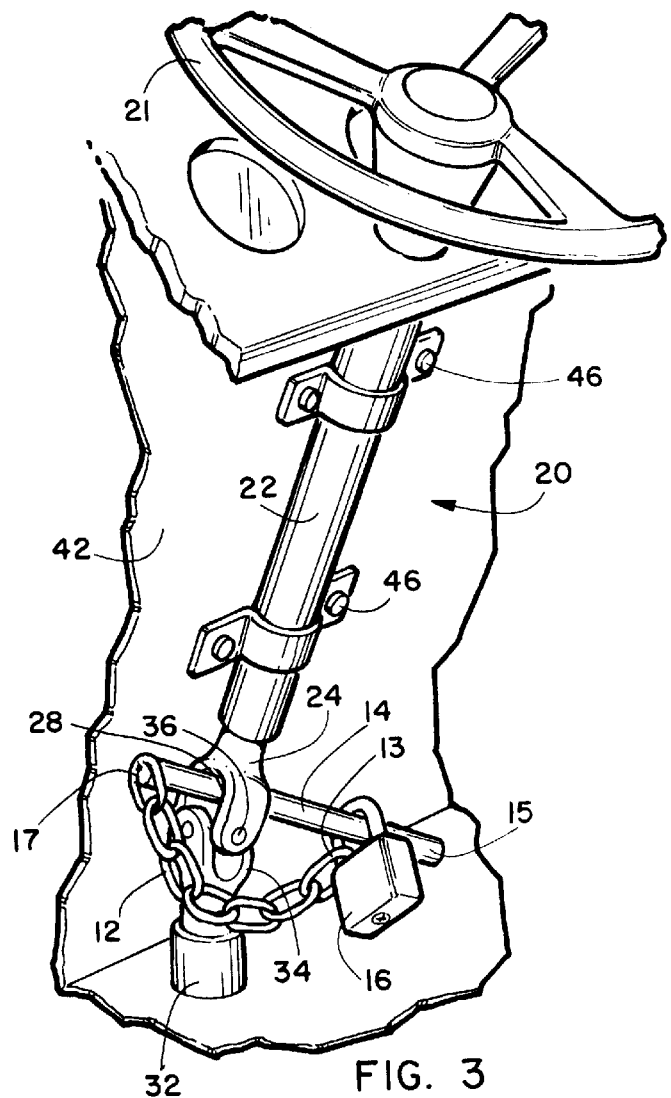
FIG. 3 is a perspective view of the steering-wheel shaft assembly with the lock in place embodying one locking method.

FIG. 3 is a detailed view of the steering-wheel assembly 20 of many heavy-duty trucks having the universal joint configuration. At the top is the steering wheel 21. The upper shaft 22 is connected to the steering wheel 21, followed by the universal joint assembly 24, 26, 36, 34, then by the lower shaft 32. The firewall 42 basically drops completely down from the windshield to the floor of the cab and the upper and lower shafts 22, 32 are held in place in a very close relationship to the firewall 42. Therefore, when the steering shaft lock 10 is inserted into either universal joint space, the steering wheel can only turned slightly as the elongated member 14 strikes the firewall 42 rendering it impossible to steer the tractor-trailer. A brace element, either brackets 44 or clamps or rings 46 or combinations thereof, on or adjacent to the firewall 42 may also be used to hold the steering shaft in place. In this manner, the upper and lower shafts 22, 32 are fully braced to the firewall 42 by the brace element for nearly the entire length of the shafts as exposed inside the cab. Similarly, with this configuration, there is approximately only a one-inch space between either shaft and the firewall. With the steering shaft lock in place as described above, the tractor-trailer cannot be steered as the elongated member strikes the firewall or the brace element preventing the tractor-trailer from being steered.

The steering shaft lock 10, employing one locking method, is in place and illustrated in this figure (FIG. 3). Here the free end 15 of the elongated member 14 was inserted through the upper space 28. It must be understood, however, that the steering shaft lock 10 may be inserted into either the upper space 28 or the lower space 38. Additionally, either end of the steering shaft lock 10 may be inserted first; that is, the free end 15 of the elongated member or the terminal end 13 of the flexible member 12. I have found that it is more efficient and expedient to insert the free end 15 of the elongated member 14 first.

Regardless, a sufficient length of the free end 15 of the elongated member 14 must protrude from the space through which the steering shaft lock 10 was inserted. The function of this protrusion is to provide an area for the flexible member 12 to lockingly mate with the elongated member 14 as the terminal end 13 of the flexible member is moved around one prong of the yoke and toward the free end 15 of the elongated member 14. The method illustrated in FIG. 3 demonstrates a mating of the terminal end 13 of the flexible member 12 with the elongated member 14 at a point adjacent to the protrusion of the elongated member 14 from the upper universal joint space 28. The shackle of a lock 16 is inserted over the protrusion of the elongated member 14 and through at least one hole of the link of the flexible member 12. Given this locking method, and the lengths of the elongated member 14 and the flexible member 12, the terminal end 13 of the flexible member 12 cannot be slid past and over the free end 15 of the elongated member 14.

Figure 4:
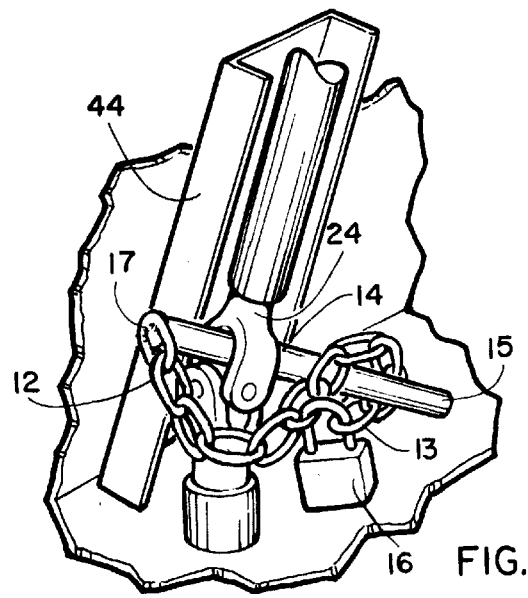
FIG. 4 is a detailed view of the steering-wheel shaft assembly with the lock in place embodying another locking method.

FIG. 4 illustrates a second method of locking the steering shaft lock to the steering-wheel assembly. In this method, after the elongated member 14 has been inserted through the joint space, the terminal end 13 of the flexible member 12 is moved toward the free end 15 of the elongated member, past the universal joint, and over and around the protrusion of the elongated member 14. The shackle of a lock 16 is inserted through two adjacent holes pinching the outer perimeter of the elongated member 14. With this method, the flexible member 12 cannot be slid past and over the free end 15 of the elongated member.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the invention. Accordingly, the scope of the invention should be determined not by the embodiments illustrated, but by the appended claims and their legal equivalents.

The invention claimed is:

1. A steering shaft lock for cab-over-engine tractor trailers having a steering wheel, a steering shaft connected to the steering wheel, and an accessible universal joint on the steering shaft, said steering shaft lock comprising:

a. an elongated member of a pre-determined length having a first end, a second end, and an outer perimeter, wherein said first end and said second end are of approximate equal dimensions to said outer perimeter, said elongated member adapted to engage an opening defined in the universal joint; and b. a flexible member of a pre-determined length connected to said second end of said elongated member, said flexible member having one or more apertures, said flexible member adapted to lockingly engage the outer perimeter of said elongated member and a locking device.

2. The invention as defined in claim 1 wherein said elongated member is comprised of a cold-rolled steel bar.

3. The invention as defined in claim 1 wherein said elongated member is comprised of a hot-rolled steel bar.

4. The invention as defined in claim 1 wherein said flexible member comprises a chain having a plurality of links adapted to encircle the outer perimeter of said elongated member and further adapted to receive a shackle of the locking device through at least two links.

5. The invention as defined in claim 1 wherein said flexible member comprises a chain having a plurality of links adapted to lockingly engage the outer perimeter of said elongated member and the locking device through at least one said link by receiving a shackle of the locking device through said at least one link after said shackle has been passed over the outer perimeter of said elongated member.

6. A method of locking the steering shaft of a tractor-trailer having a steering wheel, a steering shaft connected to the steering wheel, and an accessible universal joint on the steering shaft, the method steps comprising:

a. providing a steering shaft lock having an elongated member, said elongated member having one free end and a flexible member connected to another end each of said ends having approximately the same dimensions to an outer perimeter of said elongated member, the flexible member having one or more apertures and a terminal end distal from the elongated member;

b. inserting the steering shaft lock into a space defined by the universal joint such that at least the free end of the elongated member and the other end each protrude from the space;

c. moving the terminal end of the flexible member toward free end of the elongated member and placing the terminal end of the flexible member adjacent to, and wrapping it around, the protruding portion of the free end of the elongated member until the flexible member is in touching communication with itself;

d. providing a locking device having a shackle, opening the locking device, and inserting the shackle into at least two of the one or more apertures of the flexible member which are in touching communication and around the elongated member; and e. locking the locking device.

7. The method step of claim 6 wherein the locking relationship comprises the steps of encircling the protruding portion of the free end of the elongated member with the flexible member, placing at least two apertures of the elongated member adjacent to one another around the protruding portion of the free end of the elongated member, and inserting the locking device through the at least two apertures.

8. The method step of claim 6 wherein the locking relationship comprises the steps of placing the terminal end of the flexible member adjacent to the protruding portion of the free end of the elongated member, and inserting the locking device through at least one aperture of the flexible member and around the outer perimeter of the protruding portion of the free end of the elongated member.

9. A steering shaft lock for cab-over-engine tractor trailers having a steering wheel, a steering shaft connected to the steering wheel, and an accessible universal joint on the steering shaft, said steering shaft lock comprising:

a. an elongated member of a pre-determined length having a first end, a second end, and a curvilinear outer perimeter, wherein said first end and said second end are of approximate equal dimensions to said outer perimeter, said elongated member adapted to engage an opening defined in the universal joint; and b. a flexible member of a pre-determined length connected to said second end of said elongated member, said flexible member having one or more apertures, said flexible member adapted to lockingly engage the outer perimeter of said elongated member and a locking device.

10. The invention as defined in claim 9 wherein said elongated member is comprised of a cold-rolled steel bar.

11. The invention as defined in claim 9 wherein said elongated member is comprised of a hot-rolled steel bar.

12. The invention as defined in claim 9 wherein said flexible member comprises a chain having a plurality of links adapted to encircle the outer perimeter of said elongated member and further adapted to receive a shackle of the locking device through at least two links.

13. The invention as defined in claim 9 wherein said flexible member comprises a chain having a plurality of links adapted to lockingly engage the outer perimeter of said elongated member and the locking device through at least one said link by receiving a shackle of the locking device through said at least one link after said shackle has been passed over the outer perimeter of said elongated member.

* * * * *